(12) United States Patent
Guo

(10) Patent No.: US 10,416,491 B2
(45) Date of Patent: Sep. 17, 2019

(54) PANEL STRUCTURE, ITS MANUFACTURING METHOD, AND PROJECTION SYSTEM

(71) Applicant: BOE TECHNOLOGY GROUP CO., LTD., Beijing (CN)

(72) Inventor: Kang Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 15/556,253

(22) PCT Filed: Mar. 10, 2017

(86) PCT No.: PCT/CN2017/076260
§ 371 (c)(1),
(2) Date: Sep. 6, 2017

(87) PCT Pub. No.: WO2018/045737
PCT Pub. Date: Mar. 15, 2018

(65) Prior Publication Data
US 2018/0246372 A1 Aug. 30, 2018

(30) Foreign Application Priority Data
Sep. 9, 2016 (CN) .......................... 2016 1 0812667

(51) Int. Cl.
*G02F 1/1335* (2006.01)
*G02B 5/18* (2006.01)
(Continued)

(52) U.S. Cl.
CPC ......... *G02F 1/133528* (2013.01); *G02B 5/18* (2013.01); *G02B 5/188* (2013.01);
(Continued)

(58) Field of Classification Search
CPC ............ G02F 1/1335; G02F 1/133528; G02F 1/13439; G02F 1/1341; G02F 1/133553;
(Continued)

(56) References Cited

U.S. PATENT DOCUMENTS 5,706,066 A * 1/1998 Sawayama .............. G02F 1/315
349/113
6,454,416 B2 * 9/2002 Aoto .................... H04N 9/3105
348/742
(Continued)

FOREIGN PATENT DOCUMENTS

| CN | 1614467 A | 5/2005 |
|---|---|---|
| CN | 101025548 A | 8/2007 |

(Continued)

OTHER PUBLICATIONS

International Search Report and Written Opinion in PCT/CN2017/076260 dated May 31, 2017, with English translation.
(Continued)

*Primary Examiner* — Hoan C Nguyen
(74) *Attorney, Agent, or Firm* — Womble Bond Dickinson (US) LLP

(57) ABSTRACT

An embodiment of the present disclosure provides a panel structure, its manufacturing method and a projection system, which can improve optical efficiency of the projection system and reduce the volume of the projection system. The panel structure includes: a first substrate, a second substrate opposite to the first substrate, and a liquid crystal layer disposed between the first substrate and the second substrate; a reflective electrode at a side of the first substrate facing the second substrate; a transparent beam-splitting film disposed between the reflective electrode and the liquid crystal layer; and a common electrode disposed at a side of the second substrate facing the first substrate.

18 Claims, 3 Drawing Sheets

(51) Int. Cl.
  *G02F 1/1341* (2006.01)
  *G02F 1/1343* (2006.01)
  *G03B 21/00* (2006.01)
  *G03B 21/20* (2006.01)
  *G02F 1/1333* (2006.01)

(52) U.S. Cl.
  CPC ......... *G02B 5/1819* (2013.01); *G02B 5/1866* (2013.01); *G02F 1/1335* (2013.01); *G02F 1/1341* (2013.01); *G02F 1/13439* (2013.01); *G02F 1/133504* (2013.01); *G02F 1/133553* (2013.01); *G02F 1/133606* (2013.01); *G03B 21/006* (2013.01); *G03B 21/2073* (2013.01); *G02B 2005/1804* (2013.01); *G02F 2001/13355* (2013.01); *G02F 2001/133354* (2013.01); *G02F 2001/133507* (2013.01); *G02F 2001/133607* (2013.01); *G02F 2201/121* (2013.01); *G02F 2201/305* (2013.01); *G03B 21/208* (2013.01)

(58) Field of Classification Search
  CPC .......... G02F 2001/13355; G02F 2001/133354; G02F 2201/121; G03B 21/14; G03B 21/2073; G03B 21/006; G03B 21/208
  See application file for complete search history.

(56) References Cited

U.S. PATENT DOCUMENTS

| | | |
|---|---|---|
| 2005/0099564 A1 | 5/2005 | Wang et al. |
| 2005/0128385 A1 | 6/2005 | Liu |
| 2008/0106677 A1 | 5/2008 | Kuan et al. |
| 2012/0092590 A1* | 4/2012 | Shestak ............. G02F 1/133504 349/62 |
| 2013/0070326 A1* | 3/2013 | Frisken .................. H04L 27/18 359/279 |
| 2015/0234221 A1* | 8/2015 | Anderson ........... G02F 1/13363 349/113 |
| 2016/0291405 A1* | 10/2016 | Frisken ............. G02F 1/133504 |

FOREIGN PATENT DOCUMENTS

| | | |
|---|---|---|
| CN | 101063757 A | 10/2007 |
| CN | 101191963 A | 6/2008 |
| CN | 104914654 A | 9/2015 |
| CN | 106200102 A | 12/2016 |

OTHER PUBLICATIONS

Office Action in Chinese Application No. 201610812667.0 dated Jul. 28, 2017, with English translation.

* cited by examiner

PANEL STRUCTURE, ITS MANUFACTURING METHOD, AND PROJECTION SYSTEM

RELATED APPLICATION

This application claims the priority of Chinese Patent Application No. 201610812667.0 filed on Sep. 9, 2016, the entire contents of which is hereby incorporated by reference into the present application.

FIELD OF THE DISCLOSURE

The present disclosure relates to a technical field of a display, and particularly to a panel structure, its manufacturing method and a projection system.

BACKGROUND OF THE DISCLOSURE

With a rapid development of display technology, the demand for display technology has become higher and higher. Currently, micro-projection technology has started to be marketed, and widely used in personal consumption field and business situation, which has a broad development prospect.

Micro-projection technique is mainly based on Liquid Crystal on Silicon (LCoS) which is a novel reflective display technique organically binding an LCD and a CMOS integrated circuit. The display principle of the LCoS is similar to the display principle of LCD, that is, the display image can be controlled by polarized light modulation. The current color realization of the LCoS is mainly based on timing technique, which can sequentially form cyclical R, G and B three primary colors from white light by rapidly rotating a color wheel; during display, about 67% of light energy will lose and the light utilization efficiency is low. Micro-projection system generally uses batteries to supply power, and power consumption is restricted, thereby the brightness of the projection system is limited. Moreover, the color wheel can only be arranged outside of the LCoS, which is complicated in structure and thus the volume of the projection system is large. Therefore, the key point in the research of the LCoS is to improve the optical efficiency of the projection system and reduce the volume of the projection system.

SUMMARY OF THE DISCLOSURE

In light of this, an embodiment of the present disclosure provides a panel structure, its manufacturing method and a projection system, which can improve the optical efficiency of the projection system and reduce the volume of the projection system.

According to an aspect of the present disclosure, an embodiment of the present disclosure provides a panel structure. The panel structure comprises: a first substrate, a second substrate opposite to the first substrate, and a liquid crystal layer disposed between the first substrate and the second substrate; a reflective electrode at a side of the first substrate facing the second substrate; a transparent beam-splitting film disposed between the reflective electrode and the liquid crystal layer; and, a common electrode disposed at a side of the second substrate facing the first substrate.

The panel structure provided by the embodiment of the present disclosure comprises a transparent beam-splitting film disposed between the reflective electrode and the liquid crystal layer which can split the incident white light into beams of various colors. The reflective electrode can reflect the beams of various colors onto respective sub-pixels. In this way, color displaying can be directly realized in the panel structure. Therefore there is no need to add a color wheel structure in the projection system, which can greatly improve the optical efficiency of the projection system and reduce the volume of the projection system.

Optionally, the panel structure further comprises an optical coating disposed between the beam-splitting film and the liquid crystal layer.

In contrast to realizing diffraction by the refractive index difference between the steps and the liquid crystal, by using the optical coating arranged between the beam-splitting film and the liquid crystal layer, precise diffractive effects can be obtained and thus the beam can be accurately controlled.

Optionally, the beam-splitting film comprises at least one step group; the step group comprises three steps, the heights of the three steps satisfy equation set (1) and equation set (2):

$$\begin{cases} \frac{2\pi}{\lambda_r}(n_1-n_2)2(h_1-h_3) = 2m_{1,r}\pi + \frac{4\pi}{3} \\ \frac{2\pi}{\lambda_g}(n_1-n_2)2(h_1-h_3) = 2m_{1,g}\pi \\ \frac{2\pi}{\lambda_b}(n_1-n_2)2(h_1-h_3) = 2m_{1,b}\pi - \frac{4\pi}{3} \end{cases} \quad (1)$$

$$\begin{cases} \frac{2\pi}{\lambda_r}(n_1-n_2)2(h_2-h_3) = 2m_{2,r}\pi \\ \frac{2\pi}{\lambda_g}(n_1-n_2)2(h_2-h_3) = 2m_{2,g}\pi + \frac{4\pi}{3} \\ \frac{2\pi}{\lambda_b}(n_1-n_2)2(h_2-h_3) = 2m_{2,b}\pi - \frac{4\pi}{3} \end{cases} \quad (2)$$

Wherein $\lambda_r$, $\lambda_g$, $\lambda_b$ are wavelengths of red light, green light and blue light respectively; $n_1$, $n_2$ are the refractive index of steps and the refractive index of the optical coating respectively; $h_1$, $h_2$ and $h_3$ are heights of the three steps; $m_{1,r}$ is the diffractive order of the step with the height $h_1$ with respect to red light; $m_{1,g}$ is the diffractive order of the step with the height $h_1$ with respect to green light; $m_{1,b}$ is the diffractive order of the step with the height $h_1$ with respect to blue light; $m_{2,r}$ is the diffractive order of the step with the height $h_2$ with respect to red light; $m_{2,g}$ is the diffractive order of the step with the height $h_2$ with respect to green light; $m_{2,b}$ is the diffractive order of the step with the height $h_3$ with respect to blue light, wherein the diffractive orders of the step with height $h_3$ with respect to red light, green light and blue light are all 0 order (in order of 0).

In the embodiment of the present disclosure, the splitting of red light, green light and blue light can be realized by using a step group comprising three steps. Those skilled in the art should understand that according to the teaching of the embodiment of the present disclosure, the step group can also have other arrangements in order to have color combinations of e.g. red, yellow, green, blue (such as pixels having colors of red, yellow, green and blue).

Optionally, each step has a width d about 0.2~30 µm.

It should be understood by those skilled in the art that the width of each step can be set according to the specific dimension of each pixel in the panel structure.

Optionally, the step has a height in a range of about 0~6 µm.

Under the condition that other parameters have been defined, the heights of the steps can be obtained by the above equation set (1) and equation set (2).

Optionally, the common electrode is transparent.

By using the transparent common electrode, the utilization rate of the incident light can be further improved and the optical efficiency of the projection system can be improved.

Optionally, the second substrate is transparent.

By using the transparent second substrate, the utilization rate of the incident light can be further improved and the optical efficiency of the projection system can be improved.

Optionally, the material of the liquid crystal layer is twisted nematic liquid crystal.

By using twisted nematic liquid crystal, the polarized light incident onto the panel structure can be precisely controlled so as to obtain better display contrast.

According to another aspect of the present disclosure, an embodiment of the present disclosure provides a projection system. The projection system comprises: a white light source; a polarization beam splitter disposed in the emitting direction of the white light source; a panel structure as described in the above embodiments disposed in the reflected beam direction of the polarization beam splitter; and a projection lens disposed in the emitting direction of the panel structure.

Optionally, the polarization beam splitter is a polarization splitting prism or polarization splitting plate.

Optionally, the white light source is a collimated white light source.

By using a collimated white light source, the collimated white light can be incident onto the panel structure so as to obtain better projection displaying.

According to yet another aspect of the present disclosure, an embodiment of the present disclosure provides a method for manufacture a panel structure. The method comprises: providing a first substrate; disposing a reflective electrode on the first substrate; disposing a transparent beam-splitting film on the reflective electrode; providing a second substrate, and disposing a common electrode on the second substrate; aligning the first substrate and the second substrate to form a cell; filling a liquid crystal layer between the first substrate and the second substrate.

In the manufacturing method of the panel structure of the embodiment of the present disclosure, the panel structure comprises a transparent beam-splitting film disposed between the reflective electrode and the liquid crystal layer, which can split the incident white light into beams of various colors. The reflective electrode can reflect the beams of various colors onto respective sub-pixels. In this way, color displaying can be directly realized in the panel structure. Therefore there is no need to add a color wheel structure in the projection system which can greatly improve the optical efficiency of the projection system and reduce the volume of the projection system.

Optionally, disposing a transparent beam-splitting film on the reflective electrode comprises: disposing the transparent beam-splitting film on the reflective electrode and disposing an optical coating on the beam-splitting film.

By disposing the optical coating on the beam-splitting film, the difference between the refractive indices of the optical coating and the step is fixed. In contrast to realizing diffraction by the difference between the refractive indices of the steps and the liquid crystal, by using the optical coating arranged between the beam-splitting film and the liquid crystal layer, precise diffractive effects can be obtained and the beam can be accurately controlled.

DETAILED DESCRIPTION OF THE DISCLOSURE

The technical solution in the embodiments of the present disclosure will be described clearly and thoroughly in conjunction with the drawings in the embodiments of the present disclosure. It is clear that the described embodiments are only a part of embodiments of the present disclosure, not all embodiments of the present disclosure. Based on the embodiments of the present disclosure, all the other embodiments obtained by those ordinarily skilled in the art without any creative works are within the protection scope of the present disclosure.

Figure 1:
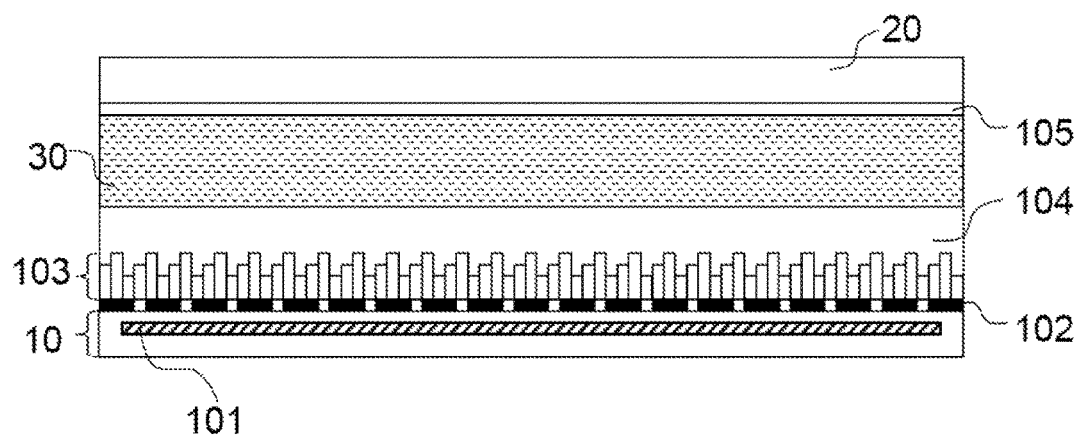
FIG. 1 is a schematic view showing a panel structure according to an embodiment of the present disclosure.

According to an aspect of the present disclosure, an embodiment of the present disclosure provides a panel structure. FIG. 1 is a schematic view of a panel structure according to an embodiment of the present disclosure. The panel structure 100 comprises: a first substrate 10, a second substrate 20 opposite to the first substrate 10, and a liquid crystal layer 30 disposed between the first substrate 10 and the second substrate 20; a reflective electrode 102 at a side of the first substrate 10 facing the second substrate 20; a transparent beam-splitting film 103 disposed between the reflective electrode 102 and the liquid crystal layer 30; and, a common electrode 105 disposed at a side of the second substrate 20 facing the first substrate 10. It should be understood by those ordinarily skilled in the art that the first substrate 10 can comprises e.g. a CMOS active drive matrix 101; the reflective electrode 102 can be controlled by the CMOS active drive matrix 101.

The panel structure provided by the embodiment of the present disclosure comprises a transparent beam-splitting film disposed between the reflective electrode and the liquid crystal layer which can split the incident white light into beams of various colors. The reflective electrode can reflect the beams of various colors onto respective sub-pixels. In this way, color display can be directly realized in the panel structure. Therefore there is no need to add a color wheel structure in the projection system which can greatly improve the optical efficiency of the projection system and reduce the volume of the projection system.

Optionally, as shown in FIG. 1, the panel structure 100 further comprises an optical coating 104 disposed between the beam-splitting film 103 and the liquid crystal layer 30.

In contrast to realizing diffraction by the difference between the refractive indices between the steps and the liquid crystal, by using the optical coating arranged between the beam-splitting film and the liquid crystal layer, precise diffractive effects can be obtained and the beam can be accurately controlled.

In order to obtain controllable diffractive effect, as shown in FIG. 1, the interface between the optical coating 104 and the liquid crystal layer 30 can be flat.

Figure 2:
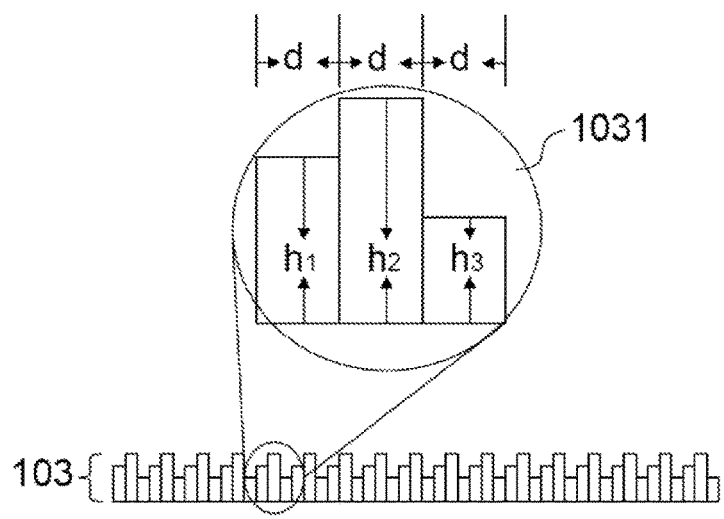
FIG. 2 is a schematic view showing a beam-splitting film according to the embodiment of the present disclosure.

Optionally, as shown in FIG. 2, the beam-splitting film 103 comprises at least one step group 1031; the step group

1031 comprises three steps, the heights h1, h2 and h3 of the three steps satisfy equation set (1) and equation set (2):

$$\begin{cases} \frac{2\pi}{\lambda_r}(n_1-n_2)2(h_1-h_3) = 2m_{1,r}\pi + \frac{4\pi}{3} \\ \frac{2\pi}{\lambda_g}(n_1-n_2)2(h_1-h_3) = 2m_{1,g}\pi \\ \frac{2\pi}{\lambda_b}(n_1-n_2)2(h_1-h_3) = 2m_{1,b}\pi - \frac{4\pi}{3} \end{cases} \quad (1)$$

$$\begin{cases} \frac{2\pi}{\lambda_r}(n_1-n_2)2(h_2-h_3) = 2m_{2,r}\pi \\ \frac{2\pi}{\lambda_g}(n_1-n_2)2(h_2-h_3) = 2m_{2,g}\pi + \frac{4\pi}{3} \\ \frac{2\pi}{\lambda_b}(n_1-n_2)2(h_2-h_3) = 2m_{2,b}\pi - \frac{4\pi}{3} \end{cases} \quad (2)$$

Wherein $\lambda_r$, $\lambda_g$, $\lambda_b$ are wavelengths of red light, green light and blue light respectively; $n_1$, $n_2$ are the refractive index of steps and the refractive index of the optical coating respectively; $h_1$, $h_2$ and $h_3$ are heights of the three steps; $m_{1,r}$ is the diffractive order of the step with the height $h_1$ with respect to red light; $m_{1,g}$ is the diffractive order of the step with the height $h_1$ with respect to green light; $m_{1,b}$ is the diffractive order of the step with the height $h_1$ with respect to blue light; $m_{2,r}$ is the diffractive order of the step with the height $h_2$ with respect to red light; $m_{2,g}$ is the diffractive order of the step with the height $h_2$ with respect to green light; $m_{2,b}$ is the diffractive order of the step with the height $h_3$ with respect to red light, wherein the diffractive orders of the step with height $h_3$ with respect to red light, green light and blue light are all 0 order.

Figure 3:
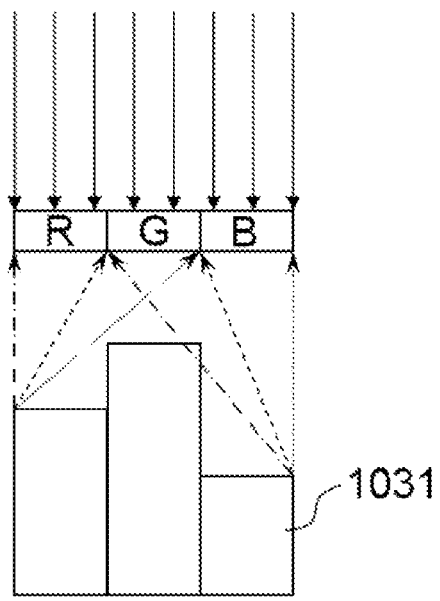
FIG. 3 is a schematic view showing a step group in the beam-splitting film according to the embodiment of the present disclosure.

As shown in FIG. 3, in an embodiment of the present disclosure, the white light incident onto the step group 1031 passes through the step group 1031 and is reflected; the incident light comprises reflected beams of different colors (indicated by different kinds of broken lines respectively), thereby obtaining three different sub-pixels with different colors.

In the embodiment of the present disclosure, the splitting of red light, green light and blue light can be realized by using a step group comprising three steps. Those skilled in the art should understand that according to the teaching of the embodiment of the present disclosure, the step group can also have other arrangements in order to have color combinations of e.g. red, yellow, green, blue (such as sub-pixels having colors of red, yellow, green and blue).

Optionally, as shown in FIG. 2, each step has a width d about 0.2~30 μm.

In some embodiments, the steps in the step group each have a same width. It should be understood by those skilled in the art that the width of each step can be set according to the specific dimension of each pixel in the panel structure.

Optionally, each step has a height about 0~6 μm.

Under the condition that other parameters are defined, the height of the step can be obtained by the above equation set (1) and equation set (2).

Optionally, the common electrode is transparent.

By using transparent common electrode, the utilization rate of the incident light can be further improved and the optical efficiency of the projection system can be improved.

Optionally, the second substrate is transparent.

By using transparent second substrate, the utilization rate of the incident light can be further improved and the optical efficiency of the projection system can be improved.

Optionally, the material of the liquid crystal layer is twisted nematic liquid crystal.

By using twisted nematic liquid crystal, the polarized light incident onto the panel structure can be precisely controlled so as to obtain better display contrast.

Figure 4:
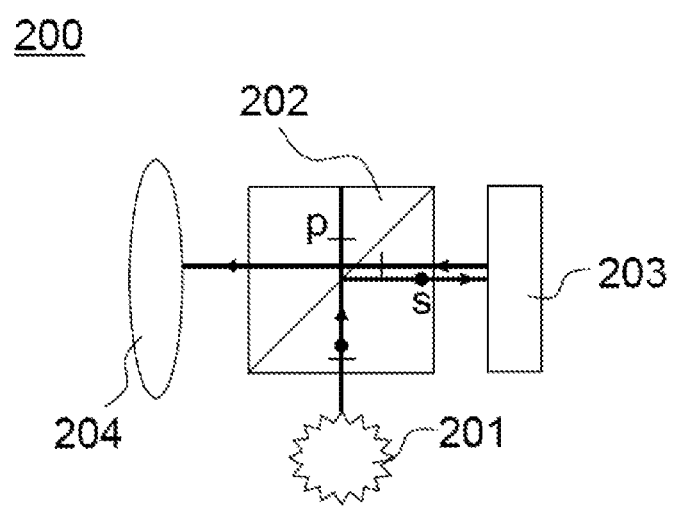
FIG. 4 is a schematic view of a projection system according to an embodiment of the present disclosure.

According to another aspect of the present disclosure, an embodiment of the present disclosure provides a projection system. As shown in FIG. 4, the projection system 200 comprises: a white light source 201; a polarization beam splitter 202 disposed in the emitting direction of the white light source 201; a panel structure 203 as described in the above embodiment disposed in the reflected beam direction of the polarization beam splitter 202; and a projection lens 204 disposed in the emitting direction of the panel structure 203.

Optionally, as shown in FIG. 4, the polarization beam splitter 202 is a polarization splitting prism or polarization splitting plate.

As shown in FIG. 4, white light emitting from a white light source 201 can be incident onto the polarization splitting prism 202; the p polarized light in the white light passes through the polarization splitting prism 202; the s polarized light in the white light is reflected onto the panel structure 203 described in the above embodiment; by using beam-splitting film in the panel structure 203, beams with different colors corresponding to a number of sub-pixels can be obtained. Meanwhile, the electric field in the liquid crystal region corresponding to each sub-pixel can be controlled by the reflective electrode so that the rotation angle of the polarization plane of the beam of each sub-pixel can be adjusted. For example, when light is emitting from the panel structure 203, the light beam of the sub-pixel with the highest grayscale (i.e. the brightest) will be rotated to become a p polarized light such that it passes through the polarization splitting prism 202 and is projected by the projection lens 204 to an image plane. The light beam of the sub-pixel with the lowest grayscale (i.e. the darkest) remains as s polarized light so that it cannot pass through the polarization splitting prism 202. It should be understood by those ordinarily skilled in the art that similar to the polarization rotation principle in the liquid crystal display device, by using different electric field strength, various polarization angles emitting from the panel structure 203 can be realized so that sub-pixels with various grayscales can be realized.

Optionally, the white light source is a collimated white light source.

By using collimated white light source, collimated white light can be incident onto the panel structure so as to obtain better projection display.

The implementation of the projection system can refer to the implementation of the above described panel structure, and a repeated description thereof will be omitted here.

Figure 5:
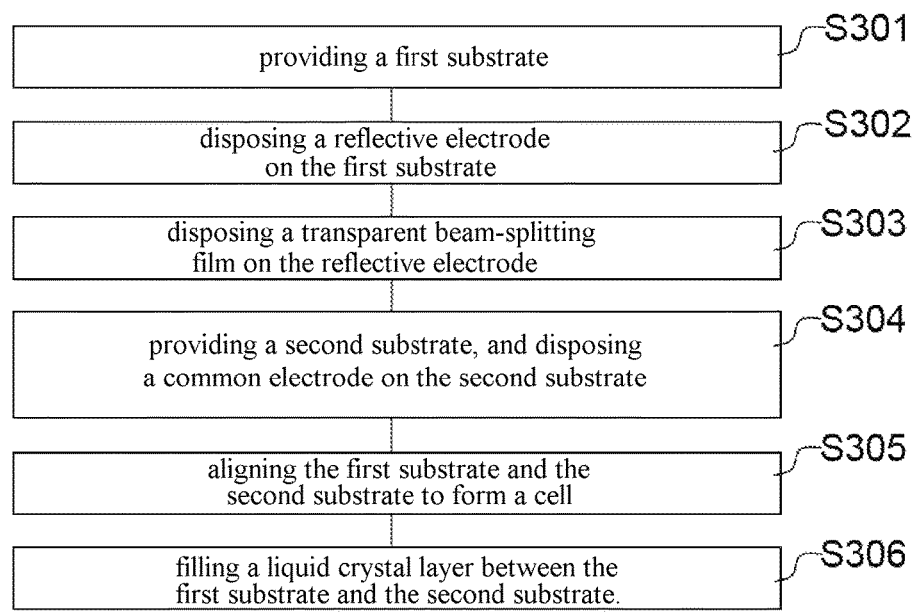
FIG. 5 is a flow chart of a method for manufacturing the panel structure according to an embodiment of the present disclosure.

According to yet another aspect of the present disclosure, an embodiment of the present disclosure provides a method for manufacturing a panel structure. The method for manufacturing the panel structure can be used to manufacture the panel structure as described in the above embodiment. As shown in FIG. 5, the method 300 comprises: S301, providing a first substrate; S302, disposing a reflective electrode on the first substrate; S303, disposing a transparent beam-splitting film on the reflective electrode; S304, providing a second substrate, and disposing a common electrode on the second substrate; S305, aligning the first substrate and the second substrate; and S306, filling a liquid crystal layer between the first substrate and the second substrate.

In the manufacturing method of the panel structure of the embodiment of the present disclosure, the panel structure comprises a transparent beam-splitting film disposed between the reflective electrode and the liquid crystal layer, which can split the incident white light into beams of various colors. The reflective electrode can reflect the beams of various colors onto respective sub-pixels. In this way, color display can be directly realized in the panel structure. Therefore there is no need to add a color wheel structure in the projection system which can greatly improve the optical efficiency of the projection system and reduce the volume of the projection system.

Optionally, disposing a transparent beam-splitting film on the reflective electrode comprises: disposing the transparent beam-splitting film on the reflective electrode and disposing an optical coating on the beam-splitting film.

By disposing the optical coating on the beam-splitting film, the difference between the refractive indices of the optical coating and the step is fixed. In contrast to realizing diffraction by the difference between the refractive indices of the steps and the liquid crystal, by using the optical coating arranged between the beam-splitting film and the liquid crystal layer, precise diffractive effects can be obtained and the beam can be accurately controlled.

It will be apparent to those skilled in the art that various modifications and variations can be made to the present disclosure without departing from the spirit or scope of the disclosure. Therefore, if those modifications and variations are within the scope of the claims of the present disclosure and its equivalents, those modifications and variations are included in the scope of the present disclosure.

The invention claimed is:

1. A panel structure, comprising:
a first substrate, a second substrate opposite to the first substrate, and a liquid crystal layer disposed between the first substrate and the second substrate;
a reflective electrode disposed at a side of the first substrate facing the second substrate;
a transparent beam-splitting film disposed between the reflective electrode and the liquid crystal layer; and an optical coating disposed between the transparent beam-splitting film and the liquid crystal layer, wherein the transparent beam-splitting film comprises at least one step group: the step group comprises three steps, heights of the three steps satisfy an equation set (1) and an equation set (2):

$$\begin{cases} \frac{2\pi}{\lambda_r}(n_1 - n_2)2(h_1 - h_3) = 2m_{1,r}\pi + \frac{4\pi}{3} \\ \frac{2\pi}{\lambda_g}(n_1 - n_2)2(h_1 - h_3) = 2m_{1,g}\pi \\ \frac{2\pi}{\lambda_b}(n_1 - n_2)2(h_1 - h_3) = 2m_{1,b}\pi - \frac{4\pi}{3} \end{cases} \quad (1)$$

$$\begin{cases} \frac{2\pi}{\lambda_r}(n_1 - n_2)2(h_2 - h_3) = 2m_{2,r}\pi \\ \frac{2\pi}{\lambda_g}(n_1 - n_2)2(h_2 - h_3) = 2m_{2,g}\pi + \frac{4\pi}{3} \\ \frac{2\pi}{\lambda_b}(n_1 - n_2)2(h_2 - h_3) = 2m_{2,b}\pi - \frac{4\pi}{3} \end{cases} \quad (2)$$

wherein $\lambda_r$, $\lambda_g$, $\lambda_b$ are wavelengths of red light, green light and blue light respectively; $n_1$, $n_2$ are a refractive index of the steps and a refractive index of the optical coating respectively; $h_1$, $h_2$ and $h_3$ are heights of the three steps respectively; $m_{1,r}$ is a diffractive order of the step with the height $h_1$ with respect to the red light; $m_{1,g}$ is a diffractive order of the step with the height $h_1$ with respect to the green light; $m_{1,b}$ is a diffractive order of the step with the height $h_1$ with respect to blue light; $m_{2,r}$ is a diffractive order of the step with the height $h_2$ with respect to the red light; $m_{2,g}$ is a diffractive order of the step with the height $h_2$ with respect to the green light; $m_{2,b}$ is a diffractive order of the step with the height $h_3$ with respect to the blue light, wherein the diffractive orders of the step with height $h_3$ with respect to the red light, green light and blue light are all in order of 0.

2. The panel structure according to claim 1, wherein a width d of each step is about 0.2~30 μm.

3. The panel structure according to claim 1, wherein a height range of the steps is about 0~6 μm.

4. The panel structure according to claim 1, wherein the common electrode is transparent.

5. The panel structure according to claim 2, wherein the common electrode is transparent.

6. The panel structure according to claim 1, wherein the second substrate is transparent.

7. The panel structure according to claim 1, wherein a material of the liquid crystal layer is twisted nematic liquid crystal.

8. The panel structure according to claim 1, wherein the common electrode is transparent.

9. The panel structure according to claim 1, wherein the common electrode is transparent.

10. The panel structure according to claim 1, wherein the second substrate is transparent.

11. The panel structure according to claim 1, wherein the second substrate is transparent.

12. The panel structure according to claim 1, wherein a material of the liquid crystal layer is twisted nematic liquid crystal.

13. The panel structure according to claim 1, wherein a material of the liquid crystal layer is twisted nematic liquid crystal.

14. A projection system, comprising:
a white light source;
a polarization beam splitter disposed in an emitting direction of the white light source;
a panel structure according to claim 1 disposed in a reflected beam direction of the polarization beam splitter; and
a projection lens disposed in an emitting direction of the panel structure.

15. The projection system according to claim 14, wherein the polarization beam splitter is a polarization splitting prism or a polarization splitting plate.

16. The projection system according to claim 14, wherein the white light source is a collimated white light source.

17. A method for manufacturing a panel structure, comprising:
providing a first substrate;
disposing a reflective electrode on the first substrate;
disposing a transparent beam-splitting film on the reflective electrode and disposing an optical coating on a surface of the transparent beam-splitting film away from the reflective electrode, wherein the transparent beam-splitting film comprises at least one step group; the step group comprises three steps, heights of the three steps satisfy an equation set (1) and an equation set (2):

$$\begin{cases} \dfrac{2\pi}{\lambda_r}(n_1-n_2)2(h_1-h_3) = 2m_{1,r}\pi + \dfrac{4\pi}{3} \\ \dfrac{2\pi}{\lambda_g}(n_1-n_2)2(h_1-h_3) = 2m_{1,g}\pi \\ \dfrac{2\pi}{\lambda_b}(n_1-n_2)2(h_1-h_3) = 2m_{1,b}\pi - \dfrac{4\pi}{3} \end{cases} \quad (1)$$

$$\begin{cases} \dfrac{2\pi}{\lambda_r}(n_1-n_2)2(h_2-h_3) = 2m_{2,r}\pi \\ \dfrac{2\pi}{\lambda_g}(n_1-n_2)2(h_2-h_3) = 2m_{2,g}\pi + \dfrac{4\pi}{3} \\ \dfrac{2\pi}{\lambda_b}(n_1-n_2)2(h_2-h_3) = 2m_{2,b}\pi - \dfrac{4\pi}{3} \end{cases} \quad (2)$$

wherein $\lambda_r$, $\lambda_g$, $\lambda_b$, are wavelengths of red light, green light and blue light respectively; $n_1$, $n_2$ are a refractive index of the steps and a refractive index of the optical coating respectively; $h_1$, $h_2$ and $h_3$ are heights of the three steps respectively; $m_{1,r}$ is a diffractive order of the step with the height $h_1$ with respect to the red light; $m_{1,g}$ is a diffractive order of the step with the height $h_1$ with respect to the green light; $m_{1,b}$ is a diffractive order of the step with the height $h_1$ with respect to blue light $m_{2,r}$ is a diffractive order of the step with the height $h_2$ with respect to the red light $m_{2,g}$ is a diffractive order of the step with the height $h_2$ with respect to the green light; $m_{2,b}$ is a diffractive order of the step with the height $h_3$ with respect to the blue light, wherein the diffractive orders of the step with height $h_3$ with respect to the red light, green light and blue light are all in order of 0.

18. The method according to claim 17, wherein disposing the transparent beam-splitting film on the reflective electrode comprises: disposing the transparent beam-splitting film on the reflective electrode and disposing an optical coating on the beam-splitting film.

* * * * *